(12) United States Patent
Katayama et al.

(10) Patent No.: US 8,685,533 B2
(45) Date of Patent: Apr. 1, 2014

(54) FLUORORESIN FILM

(75) Inventors: Hajime Katayama, Tokyo (JP); Hiroshi Aruga, Tokyo (JP)

(73) Assignee: Asahi Glass Company, Limited, Tokyo (JP)

(*) Notice: Subject to any disclaimer, the term of this patent is extended or adjusted under 35 U.S.C. 154(b) by 0 days.

(21) Appl. No.: 12/967,142

(22) Filed: Dec. 14, 2010

(65) Prior Publication Data

US 2011/0086209 A1    Apr. 14, 2011

Related U.S. Application Data

(63) Continuation of application No. PCT/JP2009/060641, filed on Jun. 10, 2009.

(30) Foreign Application Priority Data

Jun. 16, 2008    (JP) ................................. 2008-156817

(51) Int. Cl.
    *C08K 9/06*    (2006.01)

(52) U.S. Cl.
    USPC ............................. 428/323; 428/405; 428/421

(58) Field of Classification Search
    CPC ........ C08K 9/06; C08K 5/544; B32B 27/322; C09C 1/04; C09C 3/12
    USPC .......................................... 428/323, 405, 421
    See application file for complete search history.

(56) References Cited

U.S. PATENT DOCUMENTS

| | | | |
|---|---|---|---|
| 2008/0029210 A1* | 2/2008 | Swei et al. | 156/272.2 |
| 2010/0021712 A1* | 1/2010 | Katayama | 428/221 |

FOREIGN PATENT DOCUMENTS

| | | | |
|---|---|---|---|
| JP | 3-142237 | | 6/1991 |
| JP | 7-3047 | | 1/1995 |
| JP | 07165986 A | * | 6/1995 |
| JP | 8-11268 | | 1/1996 |
| JP | 10195269 A | * | 7/1998 |
| JP | 10-292056 | | 11/1998 |
| JP | 11-279358 | | 10/1999 |
| JP | 2000-287559 | | 10/2000 |
| JP | 2006-152061 | | 6/2006 |
| JP | 2007-162029 | | 6/2007 |
| JP | 2008-280465 | | 11/2008 |
| WO | WO 2008/129901 A1 | | 10/2008 |

OTHER PUBLICATIONS

Silane Coupling Agent Guide downloaded from http://www.amchro.de/PDFs/Silane/Neu-SilaneCouplingAgents08.pdf on Nov. 21, 2012.*
International Search Report issued Sep. 29, 2009 in PCT/JP2009/060641.
Extended European Search Report issued Apr. 11, 2012, in European Patent Application No. 09766572.3.

* cited by examiner

*Primary Examiner* — Elizabeth A Robinson
(74) *Attorney, Agent, or Firm* — Oblon, Spivak, McClelland, Maier & Neustadt, L.L.P.

(57) ABSTRACT

Provided is a fluororesin film comprising a fluororesin film body which contains hydrophobized silicon oxide-coated metal oxide particles and a fluororesin. The fluororesin film also contains a coating film in direct contact with the fluororesin film body and made of a coating film-forming composition containing at least one resin selected from the group consisting of a polyester, acryl polyol, acryl resin, acryl urethane resin, acryl silicone resin, vinyl acetate resin and a fluororesin, formed on one side of the fluororesin film body.

14 Claims, 1 Drawing Sheet

FLUORORESIN FILM

TECHNICAL FIELD

The present invention relates to a fluororesin film comprising a coating film formed on the surface.

BACKGROUND ART

A fluororesin film can maintain weather resistance, transparency, stain resistance, etc. for a long period of time, and therefore such a film is used as a covering film for membrane structures (such as green houses, sports facilities or tents) or a surface laminating film for various substrates.

On the back side surface of a fluororesin film to be used for a covering film, a coating film (a printing layer) comprising a printing ink is likely to be formed for the purpose of e.g. imparting visual quality. Further, on the back side surface of a fluororesin film to be used for a surface laminating film, a coating film (an adhesive layer) comprising an adhesive is formed for adhering the surface laminating film to a substrate.

However, if the fluororesin film comprising such a coating film is used outside for a long period of time, there is a problem that materials (e.g. a resin or colorant (such as a pigment or a dye)) for the coating film are deteriorated due to ultraviolet light, that is, a problem of the weather resistance of the coating film.

As a fluororesin film having a coating film with improved weather resistance, the following are proposed:

(1) A fluororesin film having a printing layer comprising a fluororesin composition, formed on at least one side of a fluororesin film body (Patent Document 1)

(2) A fluororesin film having a printing layer or an adhesive layer present on the back side surface of a fluororesin film body containing titanium oxide particles or zinc oxide particles (Patent Document 2)

(3) A fluororesin film having a layer comprising a cured product of a curable fluororesin containing a ultraviolet absorber, laminated on a surface-treated surface of a fluororesin film body (Patent Document 3)

(4) A fluororesin film comprising a fluororesin film body, and a coating film made of a coating film-forming composition containing a fluororesin having a specific functional group, formed on the fluororesin film body (Patent Document 4)

However, the fluororesin films (1) and (4) have the following problems.

(i) As a resin, only a specific fluororesin can be selected, that is, the type of a material for a coating film is restricted.

(ii) In the case of imparting weather resistance also to a colorant, only a specific inorganic pigment (a specific color) having a weather resistance can be selected as a colorant, that is, the material for a coating film is restricted.

Further, the fluororesin film (2) has the following problems.

(i) The dispersibility of titanium oxide particles or zinc oxide particles in a fluororesin is poor, and such particles are agglomerated and a fluororesin film body thus whitened, whereby transparency is deteriorated.

(ii) The fluororesin film body is deteriorated by photocatalysis of the titanium oxide particles.

(iii) Zinc oxide particles are reacted with fluorinated compounds liberated from a fluororesin at the time of producing a fluororesin film or using it outside, whereby they are formed into zinc fluoride, and therefore the ultraviolet shielding performance is weakened.

As a result, the coating film is deteriorated due to ultraviolet light.

Further, the fluororesin film (3) has the following problems.

(i) As a resin, only a specific fluororesin can be selected, that is, the type of a material for a coating film is restricted.

(ii) Since a ultraviolet absorber is easily decomposed or bled out, the lifetime of the ultraviolet absorber is short as compared with the lifetime of a fluororesin.

(iii) Since the surface of a coating film on the side irradiated with the ultraviolet light is not sufficiently shielded from the ultraviolet light, the surface easily deteriorates.

PRIOR ART DOCUMENT

Patent Documents

Patent Document 1: JP-A-3-142237
Patent Document 2: JP-A-7-003047
Patent Document 3: JP-A-8-011268
Patent Document 4: JP-A-2006-152061

DISCLOSURE OF THE INVENTION

Object to be Accomplished by the Invention

The present invention provides a fluororesin film comprising a fluororesin film body, and a coating film formed on one side of the fluororesin film body, wherein the type of the coating film material is not limited, deterioration of the coating film and the fluororesin film body due to the ultraviolet light can be suppressed for a long period of time, and further the transparency of the fluororesin film body is high.

Means to Accomplish the Object

That is, the present invention provides the following:
(1) A fluororesin film comprising:
a fluororesin film body which contains hydrophobized silicon oxide-coated metal oxide particles obtained by a production process comprising the following steps (a) to (d) and a fluororesin, and
a coating film made of a coating film-forming composition containing a resin, formed on one side of the fluororesin film body:

(a) a step of adding a silicon oxide precursor to a dispersion of metal oxide particles to form a silicon oxide layer on the surface of the metal oxide particles thereby to obtain a dispersion of silicon oxide-coated metal oxide particles;

(b) a step of adding a compound represented by the following formula (1) or a compound represented by the following formula (2), and a silicon oxide precursor, to the dispersion of silicon oxide-coated metal oxide particles, to obtain a dispersion of primarily hydrophobized silicon oxide-coated metal oxide particles,

$$R^1{}_{4-n}Si(OR^2)_n \tag{1}$$

$$R^3{}_3Si-NH-SiR^3{}_3 \tag{2}$$

(wherein $R^1$ is a $C_{1-9}$ alkyl group, $R^2$ is an alkyl group, n is an integer of from 1 to 3, and $R^3$ is an alkyl group);

(c) a step of adding a silanol-protective agent to the dispersion of primarily hydrophobized silicon oxide-coated metal oxide particles to obtain a dispersion of secondarily hydrophobized silicon oxide-coated metal oxide particles; and (d) a step of drying the secondarily hydrophobized silicon oxide-coated metal oxide particles to obtain hydrophobized silicon oxide-coated metal oxide particles.

(2) The fluororesin film according to the above (1), wherein the metal oxide particles are zinc oxide particles.

(3) The fluororesin film according to the above (1) or (2), wherein the compound represented by the formula (1) is isobutyltrimethoxysilane or n-hexyltrimethoxysilane.

(4) The fluororesin film according to the above (1) or (2), wherein the compound represented by the formula (2) is hexamethyldisilazane.

(5) The fluororesin film according to any one of the above (1) to (4), wherein the silicon oxide precursor is an alkoxysilane.

(6) The fluororesin film according to any one of the above (1) to (5), wherein the silanol-protective agent is hexamethyldisilazane.

(7) The fluororesin film according to any one of the above (1) to (6), wherein the coating film-forming composition further contains a pigment or dye.

(8) The fluororesin film according to any one of the above (1) to (7), wherein the coating film is a printing layer comprising a printing ink, or an adhesive layer comprising an adhesive.

(9) The fluororesin film according to any one of the above (1) to (8), wherein the transmittance of light at 360 nm of the fluororesin film body is at most 5%, and the haze of the fluororesin film body is at most 15%.

(10) The fluororesin film according to any one of the above (1) to (9), wherein the fluororesin is an ethylene/tetrafluoroethylene copolymer.

Effects of the Invention

The fluororesin film of the present invention is applicable to e.g. a covering film for membrane structures since the type of a material for a coating film formed on one side of a fluororesin film body is not restricted, deterioration of the coating film or the fluororesin film body due to ultraviolet light can be suppressed for a long period of time, and further the transparency of the fluororesin film body is high.

MODE FOR CARRYING OUT THE INVENTION

In the present specification, a compound represented by the formula (1) will be referred to as a compound (1). The same applies to compounds represented by the other formulae.

Figure 1:
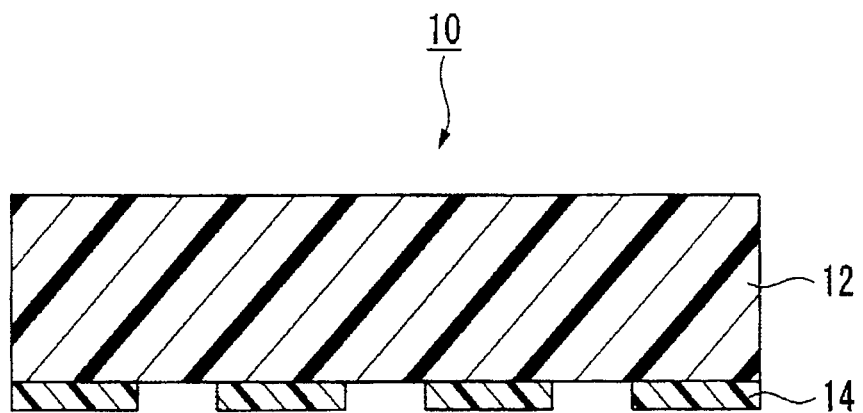
FIG. 1 is a cross-sectional view illustrating one embodiment of the fluororesin film of the present invention

FIG. 1 is a cross-sectional view illustrating one embodiment of the fluororesin film of the present invention. A fluororesin film 10 comprises a fluororesin film body 12 which contains specific hydrophobized silicon oxide-coated metal oxide particles and a fluororesin, and a printing layer 14 (coating film) comprising a printing ink (a coating film-forming composition) containing a resin, formed on one side of the fluororesin film body 12.

Figure 2:
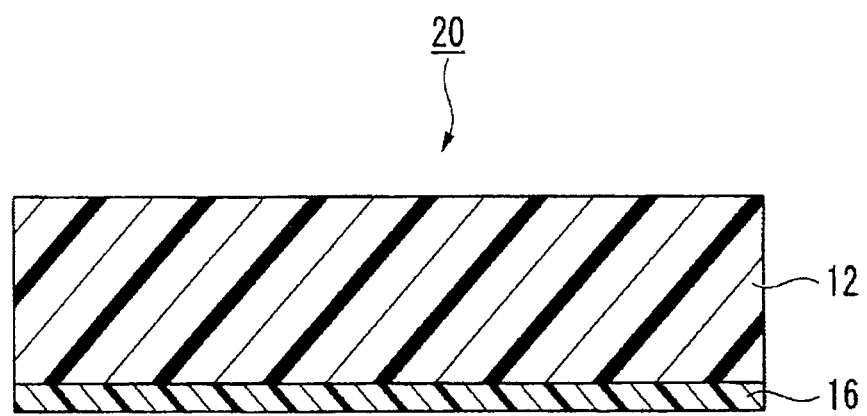
FIG. 2 is a cross-sectional view illustrating another embodiment of the fluororesin film of the present invention

FIG. 2 is a cross-sectional view illustrating another embodiment of the fluororesin film of the present invention. A fluororesin film 20 comprises a fluororesin film body 12 which contains specific hydrophobized silicon oxide-coated metal oxide particles and a fluororesin, and an adhesive layer 16 (a coating film) comprising an adhesive (a coating film-forming composition) containing a resin, formed on one side of the fluororesin film body 12.

<Fluororesin Film Body>

A fluororesin film body contains specific hydrophobized silicon oxide-coated metal oxide particles and a fluororesin.

The content of the hydrophobized silicon oxide-coated metal oxide particles in the fluororesin film body may be properly set depending upon e.g. ultraviolet-shielding properties, thickness of the fluororesin film body and span for its use required. For example, when the fluororesin film body is formed to be thin, it is necessary to add the hydrophobized silicon oxide-coated metal oxide particles at a high concentration. On the other hand, when the fluororesin film body is formed to be thick, the hydrophobized silicon oxide-coated metal oxide particles may be added at a low concentration. If the transparency and the ultraviolet-shielding performance are almost the same level, the content of the hydrophobized silicon oxide-coated metal oxide particles per unit area is almost the same regardless of the thickness of the fluororesin film body.

The type and the content of the hydrophobized silicon oxide-coated metal oxide particles may properly be adjusted depending upon the purpose of the use, so as to adjust the transmittance of the ultraviolet light. For example, they may be set as follows.

When the thickness of the fluororesin film body is 100 μm, the amount of such a ultraviolet-shielding metal oxide in the hydrophobized silicon oxide-coated metal oxide particles is preferably from 0.2 to 10.0 mass %, more preferably from 0.5 to 3.0 mass %, in the fluororesin film body (100 mass %). When the amount of the ultraviolet-shielding metal oxide in the hydrophobized silicon oxide-coated metal oxide particles is at least 0.2 mass %, the ultraviolet-shielding properties of the fluororesin film body would be good. When the amount of the ultraviolet-shielding metal oxide in the hydrophobized silicon oxide-coated metal oxide particles is at most 10.0 mass %, the ultraviolet-shielding performance in the fluororesin film would be sufficient. For example, in the case of the hydrophobized silicon oxide-coated zinc oxide particles, the amount of the hydrophobized silicon oxide-coated zinc oxide particles is preferably from 0.2 to 10.0 mass %, more preferably from 1.0 to 6.0 mass %, in the fluororesin film body (100 mass %).

Further, in order to shield the ultraviolet light at the side of a short wavelength of about 300 nm, cerium oxide is preferred as the metal oxide, and in order to shield the ultraviolet light over a wide range of 360 nm or lower, it is preferred to employ zinc oxide, titanium oxide or iron oxide depending upon the transmittance of visible light to accomplish purposes. When higher transmittance of the visible light is needed, zinc oxide is preferred.

The fluororesin film body may contain known additives (such as an organic type ultraviolet shielding agent or a filler) in order not to impair the effect of the present invention. However, the organic type ultraviolet shielding agent tends to be decomposed due to the ultraviolet light, or effused by bleeding out, and therefore such a shielding agent is inferior in weather resistance to the hydrophobized silicon oxide-coated metal oxide particles of the present invention.

The light transmittance at 360 nm of the fluororesin film is preferably at most 5%, more preferably at most 1%. When the light transmittance at 360 nm of the fluororesin film body is at most 5%, the ultraviolet light shielding properties are excellent.

Further, the light transmittance at 300 nm of the fluororesin film body is preferably at most 5%, more preferably at most 1%. When the light transmittance at 300 nm of the fluororesin film body is at most 5%, the ultraviolet shielding properties are excellent.

The light transmittances at 300 nm and 360 nm of the fluororesin film body are measured by using a commercially available spectrophotometer.

The light transmittances at 300 nm and 360 nm of the fluororesin film body after the following accelerated exposure test are preferably an initial transmittance plus at most 5%, more preferably an initial transmittance plus at most 3%. When the light transmittances at 300 nm and 360 nm of the fluororesin film body after the accelerated exposure test are an initial transmittance plus at most 5%, the weather resistance is excellent.

The accelerated exposure test of the fluororesin film body is carried out for 5,000 hours by using sunshine carbon in compliance with JIS A1415 as a light source.

The haze of the fluororesin film body is preferably at most 15%, particularly preferably at most 10%. When the haze of the fluororesin film is at most 15%, the transparency is excellent.

The haze of the fluororesin film is measured by using a commercially available haze meter.

The thickness of the fluororesin film body is preferably from 6 to 500 μm, more preferably from 10 to 300 μm.

The fluororesin film body can be obtained in such a manner that the hydrophobized silicon oxide-coated metal oxide particles and a fluororesin are mixed with each other, followed by molding by a known molding method. The hydrophobized silicon oxide-coated metal oxide particles may be agglomerated at a stage before mixing them with the fluororesin, but it is preferred that the agglomerate is pulverized so that they can readily be mixed with the fluororesin.

(Fluororesin)

The fluororesin may, for example, be a vinyl fluoride polymer, a vinylidene fluoride polymer, a tetrafluoroethylene/hexafluoropropylene/vinylidene fluoride type copolymer, a tetrafluoroethylene/propylene copolymer, a tetrafluoroethylene/hexafluoropropylene/propylene copolymer, an ethylene/tetrafluoroethylene type copolymer (hereinafter, referred to as ETFE), a hexafluoropropylene/tetrafluoroethylene copolymer or a perfluoro(alkyl vinyl ether)/tetrafluoroethylene type copolymer, and from the viewpoint of the transparency, processability and weather resistance, ETFE is preferred.

(Hydrophobized Silicon Oxide-Coated Metal Oxide Particles)

The hydrophobized silicon oxide-coated metal oxide particles are ones obtained by the after-mentioned production process.

The methanol hydrophobizing degree of the hydrophobized silicon oxide-coated metal oxide particles is preferably from 45 to 75%, more preferably from 55 to 75%.

Further, preferred methanol hydrophobizing degree varies depending upon the type of a fluororesin used for the fluororesin film body. When the fluororesin is ETFE, the methanol hydrophobizing degree is preferably from 45 to 70%, more preferably from 50 to 70%. When the fluororesin is a hexafluoropropylene/tetrafluoroethylene type copolymer or a perfluoro(alkyl vinyl ether)/tetrafluoroethylene type copolymer, the methanol hydrophobizing degree is preferably from 60 to 75%. When the fluororesin is a tetrafluoroethylene/hexafluoropropylene/vinylidene fluoride type copolymer, the methanol hydrophobizing degree is preferably from 45 to 70%, more preferably from 55 to 70%.

When the methanol hydrophobizing degree is within the range, the compatibility of the hydrophobized silicon oxide-coated metal oxide particles to the fluororesin would be good, and the dispersibility of the hydrophobized silicon oxide-coated metal oxide particles to the fluororesin would be good. As a result, the hydrophobized silicon oxide-coated metal oxide particles are hardly agglomerated in the fluororesin, and the transparency of the fluororesin film would be good.

The silicon oxide-coated metal oxide particles which are not primarily hydrophobized and secondarily hydrophobized have a methanol hydrophobizing degree of less than 10%. Since the dispersibility of the particles in the fluororesin is low, the transparency of the fluororesin film obtainable is low.

Here, the primary hydrophobization treatment is treatment with both of a silicon compound having an alkyl group bonded and a silicon oxide precursor, and the secondary hydrophobization treatment is treatment with a silanol-protective agent.

The methanol hydrophobizing degree is an index showing the hydrophobicity of the hydrophobized silicon oxide-coated metal oxide particles. The method of measuring the methanol hydrophobizing degree is as follows.

Into a 300 mL beaker, 50 mL of distilled water is charged, and while the distilled water is thoroughly stirred, 5 g of the hydrophobized silicon oxide-coated metal oxide particles are added. If such particles are uniformly dispersed in the distilled water, such particles are well compatible with the distilled water, and the methanol hydrophobizing degree is 0%. In a case where the particles are not uniformly dispersed n the distilled water, methanol is gradually dropwise added to the distilled water. The methanol hydrophobizing degree D (unit: %) is obtained by the following formula from the total amount M (unit: mL) of methanol added until the particles are uniformly dispersed in the methanol aqueous solution.

$$D = 100\,M/(M+50)$$

Here, in the measurement of the methanol hydrophobizing degree, the hydrophobizing degree of the agglomerated particles is measured, and it should be understood that the measurement is not necessarily be useful for confirming that the portion around the primary particles is coated with e.g. the alkyl group.

(Process for Producing Hydrophobized Silicon Oxide-Coated Metal Oxide Particles)

The hydrophobized silicon oxide-coated metal oxide particles are obtainable by a production process comprising the following steps (a) to (d).

(a) a step of adding a silicon oxide precursor to a dispersion of metal oxide particles to form a silicon oxide layer on the surface of the metal oxide particles thereby to obtain a dispersion of silicon oxide-coated metal oxide particles;

(b) a step of adding a compound (1) or a compound (2), and a silicon oxide precursor, to the dispersion of silicon oxide-coated metal oxide particles, to obtain a dispersion of primarily hydrophobized silicon oxide-coated metal oxide particles, $$R^1{}_{4-n}Si(OR^2)_n \tag{1}$$

$$R^3{}_3Si-NH-SiR^3{}_3 \tag{2}$$

(wherein $R^1$ is a $C_{1-9}$ alkyl group, $R^2$ is an alkyl group, $R^3$ is an alkyl group, and n is an integer of from 1 to 3);

(c) a step of adding a silanol-protective agent to the dispersion of primarily hydrophobized silicon oxide-coated metal oxide particles to obtain a dispersion of secondarily hydrophobized silicon oxide-coated metal oxide particles; and (d) a step of drying the secondarily hydrophobized silicon oxide-coated metal oxide particles to obtain hydrophobized silicon oxide-coated metal oxide particles.

Step (a):

Specifically, to a dispersion obtained by dispersing metal oxide particles in a dispersion medium, water and an organic solvent are added as the case requires, further an alkali or an acid is added thereto, and then a silicon oxide precursor is added thereto, whereby the silicon oxide precursor is hydrolyzed by the alkali or the acid, and silicon oxide is deposited on the surface of the metal oxide particles to form a silicon oxide layer, thereby to obtain a dispersion of silicon oxide-coated metal oxide particles.

As the metal oxide particles, zinc oxide particles, titanium oxide particles, cerium oxide particles or iron oxide particles may, for example, be mentioned, but zinc oxide particles are preferred since ultraviolet light at a wavelength of at most 360 nm can be adsorbed over a wide wavelength region and transparency of visible light is high. By using zinc oxide particles as the metal oxide particles, the light absorption in the visible region of the fluororesin film body becomes extremely low, and it is found that the color of the coating film is looked same when observed from either the fluororesin film body side or the coating film side.

In the dispersion of metal oxide particles, the 90% particle size of the metal oxide particles is preferably from 10 to 100 nm, more preferably from 20 to 80 nm. When the 90% particle size of the metal oxide particles is at least 10 nm, the surface area per mass of the metal oxide particles becomes not too large, whereby it is possible to suppress the amount of silicon oxide required for coating them. Here, in the case of coating them with a silicon oxide layer having the same thickness, on the assumption that the particle size distribution is the same, the metal oxide particles having a 90% particle size of 10 nm require 10 times the amount of silicon oxide, as compared with metal oxide particles having a 90% particle size of 100 nm. Further, when the 90% particle size of the metal oxide particles is at least 10 nm, it is possible to suppress the amount of the hydrophobized silicon oxide-coated metal oxide particles required for obtaining sufficient ultraviolet-shielding properties. When the 90% particle size of the metal oxide particles is at most 100 nm, it is possible to obtain a fluororesin film having sufficient transparency.

The "90% particle size" means a particle size in which, in the particle size distribution based on volume, the total of volume % from the side where the particle size is smaller, is 90%. For example, in a case where the 90% particle size is 100 nm, 90 volume % of the particles has a particle size of at most 100 nm, in the total amount of the particles (100 volume %).

In the dispersion of the metal oxide particles, 90% particle size of the metal oxide particles is not a primary particle size of the metal oxide particles, but is a size (measurement value) being practically present in the dispersion, and such a value is measured using a commercially available particle size distribution measuring device.

The concentration of the metal oxide particles is preferably from 1 to 20 mass %, more preferably from 1 to 10 mass %, in the dispersion (100 mass %). When the concentration of the metal oxide particles is at least 1 mass %, the production efficiency of the hydrophobized silicon oxide-coated metal oxide particles becomes good. When the concentration of the metal oxide particles is at most 20 mass %, the metal oxide particles hardly agglomerate, and it is thereby possible to obtain a fluororesin film having sufficient transparency.

As the dispersion medium, water; an organic solvent such as an alcohol (such as methanol, ethanol or isopropanol), a ketone (such as acetone or methyl ethyl ketone); or a mixture thereof may be mentioned.

As a method of preparing the dispersion of the metal oxide particles, the following methods may be mentioned.

(a-1) A method of adding metal oxide particles to a dispersion medium, followed by pulverizing the metal oxide particles by a pulverizer (such as a beads mill).

(a-2) A method of synthesizing metal oxide particles in a dispersion medium.

(a-3) A method of synthesizing metal oxide precursor particles in a dispersion medium, followed by heating to convert the metal oxide precursor particles to metal oxide particles.

As the organic solvent to be added to the dispersion, an alcohol (such as methanol, ethanol or isopropanol) or a ketone (such as acetone or methyl ethyl ketone) may, for example, be mentioned.

The alkali may be an alkali having no hydrocarbon group or an alkali having a hydrocarbon group, and in order to prevent scorches at the time of kneading with the fluororesin and thereby to prevent coloration of the fluororesin film, an alkali having no hydrocarbon group is preferred.

As the alkali having no hydrocarbon group, potassium hydroxide, sodium hydroxide, ammonia, ammonium carbonate or ammonium hydrogen carbonate may, for example, be mentioned, and from the viewpoint of weather resistance (moisture permeability to silicon oxide layer), it is preferred to employ ammonia which is removable by heating.

The alkali having hydrocarbon group may, for example, be dimethylamine, triethylamine or aniline.

The amount of an alkali to be used is preferably such an amount that the pH of the dispersion is from 8.5 to 10.5, more preferably from 9.0 to 10.0. When the pH of the dispersion is at least 8.5, the reaction rate does not tend to be too slow, and it is possible to suppress gelation of the dispersion. When the pH of the dispersion is at most 10.5, it is possible to suppress the dissolution of zinc oxide particles.

The acid may, for example, be hydrochloric acid or nitric acid. Further, since zinc oxide particles are dissolved in an acid, in the case of using the zinc oxide particles as metal oxide particles, it is preferred to hydrolyze the silicon oxide precursor by an alkali.

The amount of the acid to be used is preferably such an amount that the pH of the dispersion is from 3.5 to 5.5, more preferably from 4.0 to 5.0.

As the silicon oxide precursor, a silicate or an alkoxysilane may be mentioned. As the silicon oxide precursor, an alkoxysilane is particularly preferred.

As the silicate, sodium silicate or potassium silicate may, for example, be mentioned.

As the alkoxysilane, tetramethoxysilane, tetraethoxysilane (hereinafter referred to as TEOS), tetra n-propoxysilane or tetraisopropoxysilane may, for example, be mentioned.

As the silicon oxide precursor, from the viewpoint of forming it into a dense silicon oxide layer for preventing permeation of fluorinated compounds such as hydrogen fluoride which are formed in the fluororesin film body by irradiation with ultraviolet light, an alkoxysilane is preferred, and from the viewpoint of appropriate reaction rate, TEOS is preferred. In a case where the reaction rate is moderately controlled (that is, the reaction rate is not too fast), silicon oxide-coated metal oxide particles obtainable are not likely to be agglomerated. That is, from the following reason (i), the transparency of the fluororesin film becomes good. Further, from the following reason (ii), the durability of the hydrophobized silicon oxide-coated metal oxide particles to fluorinated compounds becomes also good.

(i) When the silicon oxide-coated metal oxide particles are not agglomerated, the particle size of the hydrophobized silicon oxide-coated metal oxide particles becomes sufficiently small. As a result, the transparency of the fluororesin film containing the hydrophobized silicon oxide-coated metal oxide particles becomes good.

(ii) When the silicon oxide-coated metal oxide particles are not agglomerated, hydrophobized silicon oxide-coated metal oxide particles being agglomerated, are also not obtained. Accordingly, it is not necessary to apply e.g. shear force to the hydrophobized silicon oxide-coated metal oxide particles to split the hydrophobized silicon oxide-coated metal oxide particles into particles smaller than the agglomerated particles. Accordingly, portions which are partly uncoated by the silicon oxide layer or portions which are not hydrophobized, are never formed on the hydrophobized silicon oxide-coated metal oxide particles, and therefore no fluorinated compounds can invade from such a portion. Accordingly, the durability of the hydrophobized silicon oxide-coated metal oxide particles to the fluorinated compounds becomes good.

The amount of the silicon oxide precursor to be used is such an amount that the thickness of the silicon oxide layer deposited on the surface of the metal oxide particles becomes preferably from 1 to 20 nm, more preferably from 2 to 10 nm. When the thickness of the silicon oxide layer is at least 1 nm, the durability of the hydrophobized silicon oxide-coated metal oxide particles to the fluorinated compounds becomes good. When the thickness of the silicon oxide layer is at most 20 nm, the ratio of the silicon oxide to the metal oxide particles is not too high, and therefore it is not necessary to increase the amount of the hydrophobized silicon oxide-coated metal oxide particles contained in the fluororesin film so much so as to obtain sufficient ultraviolet-shielding properties. Further, it is possible to suppress the amount of the hydrophobized silicon oxide-coated metal oxide particles contained in the fluororesin film, whereby the moldability of the fluororesin film becomes good, and further the mechanical strength becomes high.

Specifically, the amount (as calculated as $SiO_2$) of the silicon oxide precursor to be used is preferably from 10 to 200 parts by mass, more preferably from 25 to 150 parts by mass, based on 100 parts by mass of metal oxide particles.

The thickness of the silicon oxide layer can be calculated in such a manner that the surface area of metal oxide particles obtained by drying a dispersion of the metal oxide particles is measured by means of a nitrogen adsorption method, followed by calculation from the above surface area and the amount of the silicon oxide precursor. Further, in the step (a), the concentration of the silicon oxide precursor is adjusted, and therefore a core of silicon oxide consisting of only a silicon oxide precursor is not formed, whereby all the silicon oxide precursor is deposited as a silicon oxide layer on the surface of the metal oxide particles. The concentration (as calculated as $SiO_2$) of the silicon oxide precursor in the dispersion is preferably from 0.00005 to 5 equivalent/L, more preferably from 0.005 to 3 equivalent/L.

The silicon oxide precursor may be added as it is or may be properly diluted with a solvent as the case requires. The solvent may, for example, be an alcohol or a ketone.

In the step (a), the silicon oxide precursor may be added to the dispersion of the metal oxide particles all at once, or the silicon oxide precursor may continuously be added to the dispersion of the metal oxide particles by means of e.g. dropwise addition.

The temperature of the dispersion is preferably from 0 to 50° C., more preferably from 10 to 40° C. When the temperature is at least 0° C., the reaction rate is not too slow, and it takes not so long time to deposit silicon oxide.

When the temperature is at most 50° C., the metal oxide particles or silicon oxide-coated metal oxide particles obtainable do not tend to be agglomerated, whereby the particle size of the hydrophobized silicon oxide-coated metal oxide particles becomes sufficiently small. As a result, the transparency of the fluororesin film containing the hydrophobized silicon oxide-coated metal oxide particles becomes good.

In order that the pH of the dispersion are always to be within the above-mentioned range, it is preferred to properly add an alkali or an acid to the dispersion.

The concentration of the silicon oxide-coated metal oxide particles (solid content) obtainable is preferably from 1 to 40 mass %, more preferably from 3 to 30 mass % in the dispersion (100 mass %).

Step (b):

Specifically, to the dispersion of the silicon oxide-coated metal oxide particles obtained in the step (a), the compound (1) or (2) and the silicon oxide precursor are added, and the compound (1) or (2) and the silicon oxide precursor are hydrolyzed, whereby the compound (1) or (2), the silicon oxide precursor and silicon oxide coating the metal oxide particles are reacted with one another to obtain a dispersion of primarily hydrophobized silicon oxide-coated metal oxide particles.

$$R^1{}_{4-n}Si(OR^2)_n \qquad (1)$$

$$R^3{}_3Si-NH-SiR^3{}_3 \qquad (2)$$

$R^1$ is a $C_{1-9}$ alkyl group, preferably a $C_{4-6}$ alkyl group. When the number of carbon atoms in the alkyl group is at least 1, it is possible to suppress agglomeration of the hydrophobized silicon oxide-coated metal oxide particles since the alkyl group acts as steric hindrance, and further the hydrophobizing degree of the hydrophobized silicon oxide-coated metal oxide particles also increases. Accordingly, the dispersibility of the hydrophobized silicon oxide-coated metal oxide particles in the fluororesin becomes good. When the number of carbon atoms of the alkyl group is at most 9, the solubility in the dispersion medium is also high, and the reactivity with e.g. a silicon oxide precursor becomes good.

$R^2$ is an alkyl group, preferably a $C_{1-3}$ alkyl group, more preferably a $C_1$ alkyl group. As the number of carbon atoms of the alkyl group becomes small, the rate of hydrolysis becomes high, and the rate of the reaction with e.g. a silicon oxide precursor becomes also high. Further, the transparency of the fluororesin film containing hydrophobized silicon oxide-coated metal oxide particles obtained becomes high. Further, $R^2$s in the formula (1) may not necessarily be the same alkyl groups but may be different from one another.

n is an integer of from 1 to 3, and 3 is preferred from the viewpoint of reactivity with e.g. the silicon oxide precursor.

$R^3$ is an alkyl group, preferably a $C_{1-2}$ alkyl group, more preferably a $C_1$ alkyl group. As the number of carbon atoms of the alkyl group becomes small, the reactivity with the silanol group becomes good. Further, $R^3$s in the formula (2) may not necessarily be the same alkyl groups but may be different from one another.

As the compounds (1) and (2), one which is soluble in the dispersion after hydrolysis is preferred.

From the above point, as the compound (1), methyltrimethoxysilane, ethyltrimethoxysilane, n-propyltrimethoxysilane, dimethyldimethoxysilane, diisopropyldimethoxysilane, diisobutyldimethoxysilane, isobutyltrimethoxysilane, n-hexyltrimethoxysilane or n-octyltrimethoxysilane is preferred, and isobutyltrimethoxysilane or n-hexyltrimethoxysilane is particularly preferred.

As the compound (2), hexamethyldisilazane or diethyltetramethyldisilazane is preferred, particularly hexamethyldisilazane is preferred.

The amount of the compound (1) to be used is preferably from 0.01 to 5 milli equivalent (mol), more preferably from 0.05 to 1 milli equivalent (mol), to 1 g of the silicon oxide-coated metal oxide particles, and the amount of the compound (2) to be used is preferably from 0.005 to 2.5 milli equivalent (mol), more preferably from 0.025 to 0.5 milli equivalent (mol) to 1 g of the silicon oxide-coated metal oxide particles.

The compound (1) or the compound (2) may be added as they are, or may properly be diluted with a solvent as the case requires. As the solvent, an alcohol (such as methanol or ethanol) or a ketone (such as acetone) may, for example, be mentioned.

As the silicon oxide precursor, the silicon oxide precursor used in the step (a) may be mentioned.

The amount (as calculated as $SiO_2$) of the silicon oxide precursor to be used is preferably from 1 to 30 equivalent to 1 equivalent of the compound (1), and such an amount is preferably from 2 to 60 equivalent to 1 equivalent of the compound (2). Like the step (a), the silicon oxide precursor may be added as it is or may be properly diluted with a solvent as the case requires.

In the step (b), it is preferred that the compound (1) or (2) and the silicon oxide precursor are added to the dispersion substantially simultaneously. Since the compound (1) has a low reactivity with a silanol group of silicon oxide coating the metal oxide particles, firstly, the compound (1) and the silicon oxide precursor are hydrolyzed to react them. Then, the silicon oxide precursor reacted with the compound (1) and bonded thereto, is reacted with a silanol group of silicon oxide coating the metal oxide particles.

The temperature of the dispersion is preferably from 20 to 80° C., more preferably from 40 to 60° C.

The pH of the dispersion preferably has the same range as in the step (a). Further, it is preferred that an alkali or an acid is properly added to the dispersion so that the pH of the dispersion is always to be in such a range.

The concentration of the primarily hydrophobized silicon oxide-coated metal oxide particles (solid content) obtainable is preferably from 1 to 50 mass %, more preferably from 5 to 40 mass % in the dispersion (100 mass %).

Step (c):

Specifically, a silanol-protective agent is added to the dispersion of the primarily hydrophobized silicon oxide-coated metal oxide particles obtained in the step (b) to hydrolyze the silanol-protective agent, whereby the silanol-protective agent and a silanol group remaining in the primarily hydrophobized silicon oxide-coated metal oxide particles are made to react with each other to obtain a dispersion of secondarily hydrophobized silicon oxide-coated metal oxide particles.

The silanol-protective agent is a compound having only one functional group to be reacted with the silanol group after the hydrolysis.

The silanol-protective agent is preferably the compound (2) or the compound (3).

$$R^3{}_3Si\text{—}NH\text{—}SiR^3{}_3 \quad (2)$$

$$R^4{}_3SiOR^5 \quad (3)$$

$R^3$ is an alkyl group, preferably a $C_{1-2}$ alkyl group, more preferably a $C_1$ alkyl group. As the number of carbon atoms of the alkyl group becomes small, the reactivity with the silanol group becomes good. Further, $R^3$ in the formula (2) may not necessarily be the same alkyl groups but may be different from one another.

$R^4$ is an alkyl group, preferably a $C_{1-2}$ alkyl group, more preferably a $C_1$ alkyl group. As the number of carbon atoms of the alkyl group becomes small, the reactivity with the silanol group becomes good. Further, $R^4$s in the formula (3) may not necessarily be the same alkyl groups or may be different from one another.

$R^5$ is an alkyl group, preferably a $C_{1-2}$ alkyl group, more preferably a $C_1$ alkyl group. As the number of carbon atoms of the alkyl group becomes small, the reactivity with the silanol group becomes good.

The compound (2) may be hexamethyldisilazane or diethyltetramethyldisilazane.

The compound (3) may, for example, be trimethylmethoxysilane, trimethylethoxysilane, propyldimethylmethoxysilane or octyldimethylmethoxysilane may be mentioned.

As the silanol-protective agent, from the viewpoint of reactivity with the silanol group, hexamethyldisilazane is particularly preferred.

The amount of the silanol-protective agent to be used is preferably such an amount that the methanol hydrophobizing degree of the hydrophobized silicon oxide-coated metal oxide particles obtained in the step (d) becomes from 45 to 75%.

Specifically, the amount of the silanol-protective agent to be used is preferably from 1 to 200 parts by mass, more preferably from 5 to 200 parts by mass, based on 100 parts by mass of the primarily hydrophobized silicon oxide-coated metal oxide particles. Here, an unreacted silanol-protective agent and a dimer obtained by reacting the silanol-protective agents with each other, are volatilized in the step (d) and at the time of kneading with the fluororesin, and therefore influences such as agglomeration of the hydrophobized silicon oxide-coated metal oxide particles are not shown by such silanol-protective agents.

The silanol-protective agent may be added as it is, or may be properly diluted with a solvent as the case requires. As the solvent, an alcohol (such as methanol or ethanol) or a ketone (such as acetone) may, for example, be mentioned.

The temperature of the dispersion is preferably from 20 to 80° C., more preferably from 40 to 60° C. When the temperature is at least 20° C., the reaction readily proceeds, and it does not take a time for secondary hydrophobization treatment. When the temperature is at most 80° C., an alcohol in the dispersion hardly volatilize, and thus is safe.

It is preferred that the range of the pH of the dispersion is the same as in the step (a). Further, it is preferred that an alkali or an acid is properly added to the dispersion so that the pH of the dispersion is always in the above range. Further, in the case of using a silanol-protective agent which can produce an alkali due to hydrolysis, such as a compound (2), it is not necessary to adjust pH.

After the secondary hydrophobization treatment, secondarily hydrophobized silicon oxide-coated metal oxide particles may be agglomerated in the dispersion.

The concentration of the secondarily hydrophobized silicon oxide-coated metal oxide particles (solid content) obtainable is preferably from 1 to 50 mass %, more preferably from 5 to 40 mass %, in the dispersion (100 mass %).

Step (d):

As a method of drying the secondarily hydrophobized silicon oxide-coated metal oxide particles, the following methods may be mentioned.

(d-1) A method of heating the dispersion of the secondarily hydrophobized silicon oxide-coated metal oxide particles or heating them under reduced pressure to volatilize e.g. a dispersion medium.

(d-2) A method of separating the dispersion of the secondarily hydrophobized silicon oxide-coated metal oxide particles into a solid and liquid, followed by drying a solid content.

(d-3) A method of spraying e.g. the dispersion of the secondarily hydrophobized silicon oxide-coated metal oxide particles into heated gas by using a spray dryer to volatilize e.g. a dispersion medium (spray drying method).

(d-4) A method of cooling and depressurizing the dispersion of secondarily hydrophobized silicon oxide-coated metal oxide particles to sublime e.g. a dispersion medium (freeze-drying method).

As the drying method, the method of (d-3) is preferred from the following reasons (i) to (iii).

(i) Since the time for the heating is short, e.g. an alkyl group bonded to the surface by primarily hydrophobized treatment and secondarily hydrophobized treatment tends to hardly disappear, and it possible to suppress production of a silanol group, i.e. the lowering of the hydrophobization degree of the hydrophobized silicon oxide-coated metal oxide particles. Accordingly, it is possible to obtain both good dispersibility of the hydrophobized silicon oxide-coated metal oxide particles in the fluororesin and good durability to fluorinated compounds.

(ii) Since the time for the heating is short, it is possible to suppress bonding of the silanol groups to one another, which remain in the hydrophobized silicon oxide-coated metal oxide particles, whereby it is possible to suppress strong agglomeration of the hydrophobized silicon oxide-coated metal oxide particles to one another. Accordingly, it is possible to obtain good dispersibility of the hydrophobized silicon oxide-coated metal oxide particles in the fluororesin.

(iii) As compared with the freeze-drying method, it is possible to use a simple device for the drying.

The heat drying temperature is preferably from 100 to 250° C., more preferably from 100 to 150° C. When the heat drying temperature is at least 100° C., it is possible to suppress deterioration of the handling ability due to insufficiency of the drying. Further, since the amount of residues can be reduced, it is possible to suppress coloration of the fluororesin film due to e.g. thermal decomposition of the residues. When the heat drying temperature is at most 250° C., e.g. the alkyl group bonded to the surface by primary hydrophobization treatment and secondary hydrophobization treatment hardly disappears. Further, it is possible to suppress the bonding of the silanol groups to one another, which remain in the hydrophobization silicon oxide-coated metal oxide particles.

The specific hydrophobized silicon oxide-coated metal oxide particles obtained in the production process comprising the above-mentioned steps (a), (b), (c) and (d) are obtained in such a manner that the silicon oxide precursor is added to the dispersion of the metal oxide particles thereby to deposit silicon oxide on the surface of the metal oxide particles, whereby the metal oxide fine particles are coated with the silicon oxide layer, and therefore the hydrophobized silicon oxide-coated metal oxide particles are excellent in the durability to fluorinated compounds and ultraviolet-shielding properties.

Further, the specific hydrophobized silicon oxide-coated metal oxide particles obtained in the production process comprising the above-mentioned steps (a), (b), (c) and (d) are obtained in such a manner that the silicon oxide-coated metal oxide particles are primarily hydrophobized by the compound (1) or (2) and the silicon oxide precursor, and further the primarily hydrophobized silicon oxide-coated metal oxide particles are secondarily hydrophobized by the silanol-protective agent, and therefore the hydrophobized silicon oxide-coated metal oxide particles are excellent in dispersibility in fluororesins and durability to fluorinated compounds from the following reasons (i) to (vi).

(i) When the silicon oxide-coated metal oxide particles are primarily hydrophobized by the compound (1) or (2), a silicon oxide precursor is used in combination, whereby the silicon oxide precursor can compensate the low reactivity of the compound (1) or (2), and therefore the alkyl group derived from the compound (1) or (2) can sufficiently be introduced independently on the surface of the silicon oxide-coated metal oxide particles. Further, the hydrophobization treatment is carried out in the step (c) without drying the dispersion, and therefore the compound (1) or (2) having the hydrophobized silicon oxide-coated metal oxide particles bonded to one another is not present.

(ii) When the silicon oxide-coated metal oxide particles are primarily hydrophobized by the compound (1) or (2), the silicon oxide precursor is used in combination, whereby the compound (1) or (2) can sufficiently undergoes the reaction, and an unreacted compound (1) or (2) is thus reduced. Accordingly, the hydrophobized silicon oxide-coated metal oxide particles are never agglomerated by reaction of such an unreacted compound (1) or (2) with the silanol group remaining in the hydrophobized silicon oxide-coated metal oxide particles in e.g. the step (d). Accordingly, it is possible to obtain good dispersibility of the hydrophobized silicon oxide-coated metal oxide particles in the fluororesin.

(iii) Since the amount of the unreacted compound (1) or (2) is small, the hydrophobized silicon oxide-coated metal oxide particles never bonded strongly to one another by the reaction of the unreacted compound (1) or (2) with the silanol group remaining in the hydrophobized silicon oxide-coated metal oxide particles in e.g. step (d). Accordingly, even when the hydrophobized silicon oxide-coated metal oxide particles are agglomerated, they may readily be dispersed again, and at that time, the silicon oxide layer never spalls from the hydrophobized silicon oxide-coated metal oxide particles. Accordingly, for example, the durability of hydrophobized amorphous silica-coated zinc oxide particles to fluorinated compounds never deteriorates.

(iv) Since the primarily hydrophobized silicon oxide-coated metal oxide particles are secondarily hydrophobized by the silanol protective agent, it is possible to sufficiently introduce an alkyl group derived from the silanol-protective agent to the silanol group remaining in the primarily hydrophobized silicon oxide-coated metal oxide particles. The alkyl group is not chemically bonded thereto, and its cohesive force is small, and therefore it is possible to suppress strong agglomeration of hydrophobized silicon oxide-coated metal oxide particles, and further the hydrophobizing degree of the hydrophobized silicon oxide-coated metal oxide particles increases. Accordingly, the dispersibility of the hydrophobized silicon oxide-coated metal oxide particles in the fluororesins becomes good.

(v) The primarily hydrophobized silicon oxide-coated metal oxide particles are secondarily hydrophobized by the silanol-protective agent to reduce the silanol group remaining in the primarily hydrophobized silicon oxide-coated metal oxide particles, and further the distance between the hydrophobized silicon oxide-coated metal oxide particles is kept due to the alkyl group introduced by the primary hydrophobization treatment, whereby it is possible to suppress the reaction of the remaining silanol groups with one another, and it is thereby possible to prevent the strong agglomeration of the hydrophobized silicon oxide-coated metal oxide particles. Accordingly, the dispersibility of the hydrophobized silicon oxide-coated metal oxide particles in the fluororesins becomes good.

(vi) Further, the remaining silanol groups are reduced, and further the distance between the hydrophobized silicon oxide-coated metal oxide particles is kept due to the alkyl group introduced by the primary hydrophobization treatment, whereby it is possible to suppress the reaction of the remaining silanol groups with one another, and the hydrophobized silicon oxide-coated metal oxide particles are unlikely to be strongly bonded to one another. Accordingly, even if the hydrophobized silicon oxide-coated metal oxide particles are agglomerated, they may easily be dispersed again, and at that time, the silicon oxide layer never spalls from the hydrophobized silicon oxide-coated metal oxide particles. Accordingly, durability of the hydrophobized amorphous silica-coated zinc oxide particles to fluorinated compounds is never deteriorated.

<Coating Film>

A coating film is formed by applying a coating film-forming composition (such as a printing ink or an adhesive) containing a resin on one side of the fluororesin film body, and drying the composition.

The coating film may, for example, be a printing layer comprising a printing ink or an adhesive layer comprising an adhesive.

The printing layer also includes one formed by letting a printing ink be absorbed in an ink-receiving layer formed on the surface of the fluororesin film body.

(Coating Film-Forming Composition)

The coating film-forming composition is a composition containing a resin.

The coating film-forming composition may, for example, be a printing ink or an adhesive.

The resin may, for example, be a polyester, an acryl polyol, an acryl resin, an acryl urethane resin, an acryl silicone resin, a vinyl acetate resin or a fluororesin (such as a fluorocopolymer disclosed in JP-A-2006-152061 or a curable fluororesin disclosed in JP-A-8-11268).

The coating film-forming composition may contain a pigment or a dye.

The pigment may, for example, be an inorganic pigment, an organic pigment or an extender pigment.

The inorganic pigment may, for example, be titanium oxide, carbon black, red iron oxide, iron black, ultramarine blue, zinc white, chrome yellow, chrome vermilion, cobalt blue, fired green, zinc sulfide, a bronze powder, an aluminum powder or a pearl pigment.

The organic pigment may, for example, be an insoluble azo, an azo lake, quinacridone red, carmine red, watching red, perylene red, anthraquinone, disazo orange, dinitroaniline orange, acetron orange, disazo yellow, Hanza yellow, acetron yellow, phthalocyanine chloride, phthalocyanine, indanthrene blue, dioxazine violet, methyl violet, a fluorescent pigment or a phosphorescent pigment.

The extender pigment may, for example, be precipitated barium sulfate, calcium carbonate, alumina white or a clay.

The dye may, for example, be a usual acidic dye, basic dye, oil-soluble dye or disperse dye.

The coating film-forming composition may contain a solvent or an additive for the purpose of e.g. improvement of workability or surface smoothness.

The solvent may, for example, be water, an alcohol, a ketone, an ester, an ether or an aromatic hydrocarbon.

The additive may, for example, be an antioxidant, an antiphotooxidant, a surfactant, a water-soluble polymer, a gelling agent, a thickener or an anti-foaming agent.

The antiphotooxidant may, for example, be a hindered amine light stabilizer (HALS) (manufactured by ADEKA, CORPORATION, ADK STAB LA series etc.) for capturing radicals generated by photooxidation. When a coating film contains an antioxidant or an antiphotooxidant, it is possible to suppress deterioration of the organic dye not only by ultraviolet ray but also by oxidation.

The surfactant may, for example, be a sorbitan fatty acid ester, a sorbitol fatty acid ester, a diglycerin fatty acid ester, a glycerin fatty acid ester, a sorbitan fatty acid dibasic acid ester, or a compound having an alkylene oxide such as ethylene oxide or propylene oxide added thereto.

The water-soluble polymer may, for example, be a polyvinyl alcohol, a polyvinyl pyrrolidone or a polymer having a hydrophilic functional group (such as $-SO_4H$, $-SO_3H$, $-COOH$, $-CN$ or $-(OCH_2CH_2)-$).

(Printing Ink)

The printing ink usually contains a resin varnish and a pigment.

The resin varnish is usually sold in the form of a resin or the form where a resin is dissolved or dispersed in a solvent.

The resin contained in the resin varnish is preferably e.g. a polyester, an acryl polyol, an acryl resin, an acryl silicone resin or a fluororesin since the resin itself has high weather resistance and has excellent bonding property with the fluororesin film body.

The polyester may, for example, be Polyester LP050 manufactured by Nippon Synthetic Chemical Industry Co., Ltd.

The acryl polyol may, for example, be ACRYLET QT507-28 manufactured by Taisei Fine Chemical Co., Ltd.

The acryl resin may, for example, be DIANAL BP80 manufactured by Mitsubishi Rayon Co., Ltd.

The acryl silicone resin may, for example, be SILACOAT SCT-8102, manufactured by CHISSO CORPORATION.

The fluororesin may, for example, be LUMIFLON manufactured by Asahi Glass Company, Limited or THV manufactured by Dyneon LLC. The fluororesin is soluble in a solvent such as toluene or methyl ethyl ketone, and is suitable as a resin varnish. LUMIFLON is a copolymer having fluoroethylene units and vinyl ether units.

The solvent contained in the resin varnish may, for example, be an organic solvent such as toluene, xylene, methyl ethyl ketone, alcohol, Solvesso (an aromatic hydrocarbon mixture manufactured by EXXON Chemical Japan Ltd.), cyclohexanone or N-methylpyrrolidone; or water. As the solvent, an optimum solvent is selected by taking into account e.g. repellency of a printing ink on the fluororesin film body, transfer rate or drying efficiency of a printing ink, depending upon a printing method (such as a gravure printing method or a screen printing method). For example, in the gravure printing on the fluororesin film body, toluene, xylene, methyl ethyl ketone or a mixed solvent thereof is preferred from the viewpoint that it well moisten the surface of the fluororesin film body surface-treated for printing, and further its boiling point is not so high.

The pigment may, for example, be the inorganic pigment, the organic pigment or the extender pigment as mentioned above.

The printing ink may contain a solvent for dilution.

The content of the resin is preferably from 10 to 50 mass % in the printing ink (100 mass %).

The content of the pigment is preferably from 30 to 200 parts by mass, more preferably from 50 to 150 parts by mass based on 100 parts by mass of the resin varnish (solid content).

(Adhesive)

The adhesive to be used in the present invention may, for example, be a polyester type adhesive, a polyether type adhesive or an isocyanate type adhesive.

(Application Method)

An application method may be a known printing method or a coating method.

The printing method may, for example, be a gravure printing method, a screen printing method or an ink jet method.

The coating method may, for example, be brush coating, a dipping method or a spray coating method.

When the ink jet method is applied, it is preferred that an ink receiving layer is formed on the surface of the fluororesin film body. According to the ink jet method, an optional design can easily be printed depending upon the purpose of use even in the case of printing in a small amount. That is, in e.g. a gravure printing method, it is necessary to prepare a printing plate (such as a cylinder) depending upon the design, it is impossible to change the design during printing, and in addition, it requires high costs in the case of printing in a small amount.

At the time of coating, it is preferred to carry out surface treatment on the surface of the fluororesin film body at the side where a coating film is to be formed, in order to improve the bonding property between the coating film and the fluororesin film body, and in order to suppress repelling of the coating film-forming composition.

The surface treatment may, for example, be corona discharge treatment, sputter etching treatment, sodium treatment or blast treatment, and from the viewpoint of the bonding property, workability, safety and costs, corona discharge treatment is preferred.

Corona discharge treatment is treatment in which discharge is carried out between a needle or knife edge electrode and a counter electrode, a fluororesin film body is placed between the electrodes, to form a functional group containing oxygen, such as an aldehyde, an acid, an alcohol, a peroxide, a ketone or an ether on the surface of the fluororesin film body.

The sputter etching treatment is treatment in which a fluororesin film body is placed between electrodes where a low pressure glow discharge is carried out, and a plurality of fine projections are formed on the surface of the fluororesin film body by the impact of positive ions generated by the glow discharge.

The sodium treatment is treatment in which a fluororesin film body is immersed in a liquid ammonia solution of an alkali metal such as metallic sodium whereby $CF_2$ bonds are disappeared from the surface of the fluororesin film body and e.g. CH bonds or CO bonds are formed.

The blast treatment is treatment in which a blast material such as fine sands or baking soda is sprayed on the surface of the fluororesin film body, to form a plurality of fine irregularities.

The coating film may be formed on the entire surface of the fluororesin film body or a part of the surface of the fluororesin film body in a desired shape.

It is preferred that the coating film is dried at from 60 to 150° C. for 2 to 30 seconds for improving the bonding properties between the coating film and the fluororesin film body.

<Covering Film>

The fluororesin film of the present invention is used as a covering film for roofing materials or wall covering materials of membrane structures.

The membrane structures may, for example, be greenhouses, sports facilities or tents.

A covering film is covered so that the fluororesin film body is on the sunlight-incoming side.

Further, when two sheets of covering films are used as a pair, it is preferred that the two covering films are overlaid so that the coating film sides face each other, and dry air is blown between the two covering films, followed by covering, whereby the coating film is not influenced by not only ultraviolet lights, but also water droplets, moisture or dirt in the air.

<Surface Laminate Film>

In a case where the coating film is an adhesive layer, the fluororesin film of the present invention is used as a surface laminate film for various substrates.

The substrate may, for example, be a covering material for construction, a road traffic sign, an advertising display, a chemical plant (such as a tank or a pipe) or civil engineering and construction structures (such as a bridge or a dam).

<Other Applications>

As other applications of the fluororesin film of the present invention, a protective film from a generation source of ultraviolet light may be mentioned.

Since in the fluororesin film of the present invention as mentioned above, the fluororesin film body contains a fluororesin, the fluororesin film body is less deteriorated due to the ultraviolet light, as compared with other general-purpose resin films.

Further, since the fluororesin film body contains specific hydrophobized silicon oxide-coated metal oxide particles which are excellent in dispersibility in the fluororesin, the hydrophobized silicon oxide-coated metal oxide particles are hardly agglomerated in the fluororesin film body, and therefore they are hardly formed into larger particles. As a result, the fluororesin film body is excellent in the transparency.

Further, since the fluororesin film body contains the specific hydrophobized silicon oxide-coated metal oxide particles which are excellent in the ultraviolet shielding performance, the fluororesin film body is excellent in the ultraviolet shielding performance.

Further, since the fluororesin film body contains the specific hydrophobized silicon oxide-coated metal oxide particles excellent in the durability to fluorinated compounds, the metal oxide particles will not be formed into a metal fluoride by the fluorinated compound. As a result, the ultraviolet shielding performance of the fluororesin film body is maintained for a long period of time.

Further, since a coating film is formed on one side (back side surface) of the fluororesin film body of which the ultraviolet shielding performance is maintained for a long period of time, it is possible to suppress deterioration of the coating film by the ultraviolet light for a long period of time. As a result, as a material for the coating film, even a material having low weather resistance can be used without any particular restriction.

That is, since there is no restriction on a material for the coating film, the following advantages are obtained.

For example, in the case of using an inorganic pigment showing little deterioration in ultraviolet light, a variety of color to be expressed is small. On the other hand, an organic pigment or an organic dye which can express a variety of colors tends to fade by decomposition due to ultraviolet light.

In the case of the fluororesin film of the present invention, an ultraviolet shielding performance of a fluororesin film body is maintained for a long period of time, whereby no fading occurs for a long period of time even when e.g. an organic pigment or an organic dye is used.

Further, in the case of using a photocatalytic pigment (e.g. titanium oxide), a resin contained in the coating film is decomposed, whereby the coating film tends to be opaque or delaminated.

In the fluororesin film of the present invention, since the fluororesin film body has ultraviolet shielding performance, it is possible to suppress photocatalysis of a pigment, and it is possible to express an original color of the pigment for a long period of time.

Further, in the fluororesin film of the present invention, it is possible to use e.g. a pigment or a dye having a special performance (such as a heat shielding, antistatic, wavelength conversion, photochromic or thermochromic performance), which cannot be used since it has no weather resistance, and it is possible to produce a functional film which can be used for a long period of time.

Further, in the fluororesin film of the present invention, it is possible to provide a covering film or a surface laminate film, provided with a printing layer which is not deteriorated for a long period of time even when a cheap resin is used instead of a special resin having weather resistance.

Further, by selecting a resin with good coating properties, it is possible to select a coating method with good workability.

Further, in the fluororesin film of the present invention, a coating film may properly be formed on both sides of the fluororesin film body as the case requires.

EXAMPLES

Now, the present invention will be described in further detail with reference to Examples, but it should be understood that the present invention is by no means restricted thereto.

Examples 1 and 2 are Examples of the present invention, and Examples 3 to 6 are Comparative Examples.

(Particle Size of Metal Oxide Particles)

Regarding the dispersion of a metal oxide, by using a particle size distribution measuring apparatus (MICROTRAC 9340UPA, manufactured by NIKKISO CO., LTD), the particle size distribution of the metal oxide on volume base was measured, and from the particle size distribution, an average particle size, a 90% particle size and a 10% particles size were obtained.

(Methanol Hydrophobizing Degree)

Into a 300 mL beaker, 50 mL of distilled water was put, and while the distilled water was thoroughly stirred, 5 g of particles were added. Methanol was gradually dropwise added to the distilled water, and the methanol hydrophobizing degree D (unit: %) was obtained by the following formula from the total amount M (unit: mL) of methanol added until the particles were uniformly dispersed in the methanol aqueous solution.

$$D=100M/(M+50)$$

(Light Transmittances at 360 nm)

In compliance with JIS K7105, the light transmittances at 360 nm of the fluororesin film body was measured by using a spectrophotometer (UV-3100PC, manufactured by Shimadzu Corporation).

(Haze)

In compliance with JIS K7105, the haze of the fluororesin film body was measured three times by using a hazemeter (hazemeter HGM-2K, manufactured by Suga Test Instruments Co., Ltd.) to obtain an average value thereof.

(Front and Back Side Appearance Comparison Test)

From the side of a printing layer and the opposite side of the printing layer, a fluororesin film was observed, and evaluation was made on the basis of the following standards.

◯: No differences in printing pattern and color observed between front and back side surfaces.

×: Distinct difference in printing patter observed between front and back side surfaces.

(Accelerated Weather Resistance Test)

A weather resistance test for 5,000 hours was carried out by using a Sunshine Weather Meter (300 Sunshine Weather Meter manufactured by Suga Test Instruments Co., Ltd.) equipped with an open frame carbon arc lamp in compliance with JIS K3750-4. The accelerated weather resistance test was carried out by back printing exposure in which light enters from the side of the fluororesin film body.

(Appearance Comparison Test)

A fluororesin film after the accelerated weather resistance test and a fluororesin film which was not subjected to the accelerated weather resistance test were visually compared, and the difference in appearance was evaluated on the basis of the following standards.

◯: No difference observed.

Δ: A fluororesin film somewhat faded or whitened.

×: Clearly different color/pattern observed.

(Peel Strength Test)

After the accelerated weather resistance test, a cellophane tape was bonded to the printing layer, and peeled, whereupon the state of the printing layer was visually confirmed and evaluated on the basis of the following standards.

◯: No peeling of the printing layer observed.

×: Peeling of the printing layer observed.

××: The printing layer dropped off before bonding a cellophane tape.

Example 1

Production of Hydrophobized Silicon Oxide-Coated Zinc Oxide Particles

Zinc oxide particles (FZO-50 manufactured by Ishihara Sangyo Kaisha, Ltd.) were dispersed in water by a beads mill to obtain a dispersion (solid content concentration: 20 mass %) of zinc oxide particles. The average particle size of the zinc oxide particles in the dispersion of the zinc oxide particles was 35 nm, 90% particle size thereof was 80 nm, and 10% particle size thereof was 22 nm.

Step (a):

While 336 g of the dispersion was thoroughly stirred, 491 g of water and 506 g of a mixed alcohol reagent (API, manufactured by Japan Alcohol Trading Co., Ltd., ethanol: 85.5 mass %, methanol: 1.1% and isopropanol: 13.4 mass %) were added to the dispersion, and the dispersion was heated up to 30° C. Then, the pH of the dispersion was adjusted to 9.5 by using a 28 mass % aqueous ammonia (manufactured by KANTO CHEMICAL CO., INC.), and then 156 g (66.9 parts by mass as calculated as $SiO_2$, based on 100 parts by mass of zinc oxide particles) of TEOS (manufactured by KANTO CHEMICAL CO., INC.) was added to the dispersion while the dispersion was stirred. Then, while a 28 mass % aqueous ammonia (manufactured by KANTO CHEMICAL CO., INC.) was added to the dispersion so that the pH of the dispersion would be from 9.4 to 9.6, the dispersion was stirred for 8 hours, and TEOS was hydrolyzed to deposit silicon oxide on the surface of the zinc oxide particles thereby to form a silicon oxide layer, whereby 1,498 g of a dispersion of silicon oxide-coated zinc oxide particles having a solid content concentration of 7.5 mass % was obtained. The total amount of the aqueous ammonia added was 9.4 g. The concentration of the amount (as calculated as $SiO_2$) of a silicon oxide precursor in the dispersion was 0.54 milli equivalent/L, and the thickness of the silicon oxide layer calculated from the surface area of the zinc oxide particles obtained by a nitrogen adsorption method and the amount of TEOS added, was 5.5 nm.

Step (b):

90 g of the dispersion of the silicon oxide-coated zinc oxide particles was heated up to 60° C., and then 1.95 g of TEOS (manufactured by KANTO CHEMICAL CO., INC.) and 0.24 g of isobutyltrimethoxysilane (AY43-048, manufactured by Dow Corning Toray Silicone Co., Ltd.) were added to the dispersion almost at the same time. While a 1 N aqueous ammonia (manufactured by KANTO CHEMICAL CO., INC.) was added to the dispersion so that the pH of the dispersion would be from 9.5 to 9.6, the dispersion was stirred for 20 minutes, and TEOS and isobutyltrimethoxysilane were hydrolyzed to be reacted with silicon oxide coating the zinc oxide particles, whereby 108 g of a dispersion of primarily hydrophobized silicon oxide-coated zinc oxide particles having a solid content concentration of 6.9 mass % was obtained. The amount of the 1 N aqueous ammonia added was 16.4 g. Here, the amount of isobutyltrimethoxysilane is 0.20 milli equivalent to 1 g of the silicon oxide-coated zinc oxide particles, and the amount of TEOS corresponds to 7.0 equivalent to 1 equivalent of isobutyltrimethoxysilane.

Step (c):

5 g of hexamethyldisilazane (TSL8802, manufactured by GE Toshiba Silicone Co., Ltd.) was added to the dispersion, the dispersion was stirred for 1 hour, and hexamethyldisilazane was hydrolyzed to be reacted with a silanol group remaining in the primarily hydrophobized silicon oxide-coated metal oxide particles, whereby 113 g of a dispersion of secondarily hydrophobized silicon oxide-coated zinc oxide particles having a solid content concentration of 6.7 mass % was obtained. Further, the amount of hexamethyldisilazane added was 67 parts by mass based on 100 parts by mass of the primarily hydrophobized silicon oxide-coated zinc oxide particles.

Step (d):

The dispersion was put in an aluminum dish and left to stand for drying at 120° C. to obtain an agglomerate of the hydrophobized silicon oxide-coated zinc oxide particles. The agglomerate was so fragile that it was easily broken when pushed with fingers. The agglomerate was put in a plastic bag and lightly pressed with fingers to obtain hydrophobized silicon oxide-coated zinc oxide particles. The methanol hydrophobizing degree of the hydrophobized silicon oxide-coated zinc oxide particles was 60%.

Production of Fluororesin Film Body:

35.0 g of ETFE (ethylene/tetrafluoroethylene copolymer) (C-88AXP, manufactured by Asahi Glass Company, Limited) and 0.53 g (1.5 parts by mass as hydrophobized silicon oxide-coated zinc oxide particles and 0.8 part by mass as zinc oxide, based on 100 parts by mass of ETFE) of hydrophobized silicon oxide-coated zinc oxide particles were kneaded under conditions at 280° C. at 100 rpm for 10 minutes by Laboplasto mill to obtain a mixture. The mixture was pressed at 295° C. for 5 minutes to obtain a 200 μm-thick fluororesin film body having a hydrophobized silicon oxide-coated zinc oxide particles concentration of 1.5 mass %.

Production of Printing Ink:

To 100 g of a solution (ACRYLET QT507-28 manufactured by Taisei Fine Chemical Co., Ltd., solid content: 50 mass %, toluene: 25 mass %, butyl acetate: 25 mass %) of an acrylic polyol as a resin varnish, 55 g of a titanium oxide pigment (CR50, manufactured by Ishihara Sangyo Kaisha, Ltd., average particle size: 0.2 μm) was added, and dispersed by a ball mill to obtain a white printing ink. Further, 80 g of a solvent mixture of toluene/methyl ethyl ketone=50/50 by mass ratio was added to adjust the viscosity.

Preparation of Fluororesin Film:

Corona discharge treatment was applied to the fluororesin film body at a treatment density of 150 W·min/m² in the air. The light transmittance at 360 nm of the film before printing was 0.8%, and the haze was 10%. To the surface of the fluororesin film body, which was subjected to the corona discharge treatment, the printing ink was applied to form a polka-dot pattern by a screen printing method so that the thickness after drying would be 1.2 μm, and the coating film was dried at 100° C. for 60 seconds to obtain a fluororesin film with a printing layer. The results of the front and back side appearance comparison test, the appearance comparison test and the peel strength test before and after the accelerated weather resistance test are shown in Table 1.

Example 2

A printing ink was obtained in the same manner as in Example 1 except that a perylene organic pigment (Paliogen Red L3875 manufactured by BASF) was used instead of the titanium oxide pigment.

A fluororesin film having a printing layer was obtained in the same manner as in Example 1 except that the printing ink was used. The results of the front and back side appearance comparison test, and the appearance comparative test and the peel strength test before and after the accelerated weather resistance test are shown in Table 1.

Example 3

A fluororesin film having a printing layer was obtained in the same manner as in Example 1 except that a 200 μm-thick ETFE film containing no hydrophobized silicon oxide-coated zinc oxide, was used as the fluororesin film body. The results of the front and back side appearance comparison test, and the appearance comparison test and the peel strength test before and after the accelerated weather resistance test are shown in Table 1.

Example 4

A fluororesin film having a printing layer was obtained in the same manner as in Example 1 except that the ETFE film in Example 3 was used as the fluororesin film body and the printing ink in Example 2 was used as the printing ink. The results of the front and back side appearance comparison test, and the appearance comparison test and the peel strength test before and after the accelerated weather resistance test are shown in Table 1.

Example 5

Production of Fluororesin Film Body:

35.0 g of ETFE (C-88AXP manufactured by Asahi Glass Company, Limited) and 0.28 g of zinc oxide particles (FZO-50 manufactured by Ishihara Sangyo Kaisha, Ltd., average particle size: 0.02 μm) were kneaded under conditions at 280° C. at 100 rpm for 10 minutes by Laboplasto mill to obtain a mixture. The mixture was pressed at 295° C. for 5 minutes to obtain a 200 μm-thick fluororesin film body having a zinc oxide particle concentration of 0.8 mass %.

Production of Fluororesin Film:

Corona discharge treatment was applied to the fluororesin film body at a treatment density of 150 W·min/m² in the air. The light transmittance at 360 nm of the film before printing was 1%, and the haze was 60%. To the surface of the fluororesin film body, which was subjected to the corona discharge treatment, the printing ink in Example 2 was applied to form a polka-dot pattern by a screen printing method so that the thickness after drying would be 1.2 μm, and the coating film was dried at 100° C. for 60 seconds to obtain a fluororesin film with a printing layer. The results of the front and back side appearance comparison test, and an appearance comparison test and a peel strength test before and after the accelerated weather resistance test are shown in Table 1.

Example 6

Production of Fluororesin Film Body:

A fluororesin film body was obtained in the same manner as in Example 5 except that the zinc oxide particle concentration was 0.06 mass %.

Production of Fluororesin Film:

Corona discharge treatment was applied to the fluororesin film body at a treatment density of 150 W·min/m² in the air. The light transmittance at 360 nm of the film before printing was 60%, and the haze was 10%. To the surface of the fluororesin film body, which was subjected to the corona discharge treatment, the printing ink in Example 2 was applied to form a polka-dot pattern by a screen printing method so that the thickness after drying would be 1.2 μm, and the coating film was dried at 100° C. for 60 seconds to obtain a fluororesin film with a printing layer. The results of the front and back side appearance comparison test, and the appearance comparison test and the peel strength test before and after the accelerated weather resistance test are shown in Table 1.

TABLE 1

| | Filler in fluororesin | Pigment for printing ink | Light transmittance at 360 nm (%) | Front and back side appearance comparison test | Accelerated weather resistance test | |
|---|---|---|---|---|---|---|
| | | | | | Appearance comparison test | Peel strength test |
| Ex. 1 | Hydrophobized silicon oxide-coated zinc oxide particles | Titanium oxide | 0.8 | ◯ | ◯ | ◯ |
| Ex. 2 | Hydrophobized silicon oxide-coated zinc oxide particles | Organic pigment | 0.8 | ◯ | ◯ | ◯ |
| Ex. 3 | Nil | Titanium oxide | 88 | ◯ | X | X X |
| Ex. 4 | Nil | Organic pigment | 88 | ◯ | X | X X |
| Ex. 5 | Zinc oxide particles | Organic pigment | 1 | X | Δ | X |
| Ex. 6 | Zinc oxide particles | Organic pigment | 60 | ◯ | X | X X |

In the case of the fluororesin film in Example 1 or 2, since the fluororesin film body before printing is highly transparent, the color of the printing layer hardly changed when observed from the front side and back side of the printing layer.

In the case of the fluororesin film in Example 3, a part of the printing layer was peeled after the accelerated weather resistance test, and no good looking polka-dot pattern was formed. It is considered that this is because of deterioration of the resin of the printing layer by photocatalysis of the titanium oxide pigment.

In the case of the fluororesin film in Example 4, before the accelerated weather resistance test, the color of the printing layer hardly changed and a red polka-dot pattern was shown when observed from front side and back side,. After the accelerated weather resistance test, the red polka-dot pattern was changed to dark black. It is considered that this is because of deterioration of the organic pigment due to ultraviolet light. Further, the printing layer was partly peeled although such a part was not so large as compared with the fluororesin film in Example 3.

In the case of the fluororesin film in Example 5, since the haze of the fluororesin film body before printing is high, the pattern was obscure even when the printing layer was observed from the fluororesin film body side. After the accelerated weather resistance test, a red polka-dot pattern somewhat changed to black, and further the fluororesin film body which was white before the accelerated resistance test became transparent. It is considered that this is because hydrogen fluoride generated in the fluororesin film body by ultraviolet irradiation was reacted with zinc oxide, which was removed from the fluororesin film body. As might be expected, it is considered that the ultraviolet shielding performance is also deteriorated and the deterioration of the organic pigment is accelerated. In the peel strength test, a part of the printing layer was peeled.

In the case of the fluororesin film in Example 6, it was possible to recognize a printing pattern even when the printing layer was observed from the fluororesin film body side before the accelerated weather resistance test. After the accelerated weather resistance test, a red polka-dot pattern was changed to black, and further a part of the coating film was peeled even before the peel strength test. It is considered that this is because of deterioration of the organic pigment and deterioration/decomposition of the resin due to ultraviolet light.

INDUSTRIAL APPLICABILITY

The fluororesin film of the present invention is useful as a covering film for membrane structures (such as greenhouses, sport facilities or tents) or a surface laminating film for various substrates.

The entire disclosure of Japanese Patent Application No. 2008-156817 filed on Jun. 16, 2008 including specification, claims, drawings and summary is incorporated herein by reference in its entirety.

| DESCRIPTION OF SYMBOLS | |
|---|---|
| 10: | fluororesin film |
| 12: | fluororesin film body |
| 14: | printing layer (coating film) |
| 16: | adhesive layer (coating film) |
| 20: | fluororesin film |

What is claimed is:

1. A fluororesin film, comprising:
a fluororesin film body which contains hydrophobized silicon oxide-coated metal oxide particles obtained by a process comprising the following steps (a) to (d) and a fluororesin, and
a coating film in direct contact with the fluororesin film body and made of a coating film-forming composition containing at least one resin selected from the group consisting of a polyester, acryl polyol, acryl resin, acryl urethane resin, acryl silicone resin, vinyl acetate resin and a fluororesin, formed on one side of the fluororesin film body:
(a) adding at least one silicon oxide precursor selected from the group consisting of tetramethoxysilane, tetraethoxysilane, tetra n-propoxysilane and tetraisopropoxysilane to a dispersion of metal oxide particles to form a silicon oxide layer on the surface of the metal oxide particles to obtain a dispersion of silicon oxide-coated metal oxide particles;
(b) adding a compound represented by the following formula (1) and at least one silicon oxide precursor selected from the group consisting of tetramethoxysilane, tetraethoxysilane, tetra n-propoxysilane and tetraisopropoxysilane, to the dispersion of silicon oxide-coated metal oxide particles, to obtain a dispersion of primarily hydrophobized silicon oxide-coated metal oxide particles, $$R^1_{4-n}Si(OR^2)_n \quad (1)$$

wherein $R^1$ is a $C_{1-9}$ alkyl group, $R^2$ is an alkyl group, and n is an integer of from 1 to 3;
(c) adding a silanol-protecting agent to the dispersion of primarily hydrophobized silicon oxide-coated metal oxide particles to obtain a dispersion of secondarily hydrophobized silicon oxide-coated metal oxide particles, wherein the silanol-protective agent is a compound represented by the following formula (2a):

$$R^3_3Si-NH-SiR^3_3 \quad (2a)$$

wherein
each $R^3$ is, independently, a $C_{1-2}$ alkyl group; and (d) drying the secondarily hydrophobized silicon oxide-coated metal oxide particles to obtain hydrophobized silicon oxide-coated metal oxide particles.

2. The fluororesin film according to claim 1, wherein the metal oxide particles are zinc oxide particles.

3. The fluororesin film according to claim 1, wherein the silanol-protective agent is hexamethyldisilazane.

4. The fluororesin film according to claim 1, wherein the coating film-forming composition further contains a pigment or dye.

5. The fluororesin film according to claim 1, wherein the coating film made of a coating film-forming composition is a printing layer comprising a printing ink, or an adhesive layer comprising an adhesive.

6. The fluororesin film according to claim 1, wherein the transmittance of light at 360 nm of the fluororesin film body is at most 5%, and the haze of the fluororesin film body as measured by a haze meter according to JIS K7105 is at most 15%.

7. The fluororesin film according to claim 1, wherein the fluororesin is an ethylene/tetrafluoroethylene copolymer.

8. The fluororesin film according to claim 1, wherein the resin is a polyester.

9. The fluororesin film according to claim 1, wherein the resin is a acryl polyol.

10. The fluororesin film according to claim 1, wherein the resin is an acryl resin.

11. The fluororesin film according to claim 1, wherein the resin is an acryl urethane resin.

12. The fluororesin film according to claim 1, wherein the resin is an acryl silicone resin.

13. The fluororesin film according to claim 1, wherein the resin is a vinyl acetate resin.

14. The fluororesin film according to claim 1, wherein the resin is a fluororesin.

* * * * *